(12) United States Patent
Chen et al.

(10) Patent No.: US 7,529,461 B1
(45) Date of Patent: May 5, 2009

(54) LIGHT GUIDE PLATE WITH COMPENSATED EMISSION LIGHT FIELD

(75) Inventors: Wei-Hsuan Chen, Kaohsiung (TW); Pei-Ling Kao, Kaohsiung (TW); Chun-Hsien Li, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 11/942,735

(22) Filed: Nov. 20, 2007

(51) Int. Cl.
*G02B 6/10* (2006.01)
*F21V 7/04* (2006.01)
(52) U.S. Cl. .................. 385/146; 385/901; 362/620
(58) Field of Classification Search .................. None
See application file for complete search history.

(56) References Cited

U.S. PATENT DOCUMENTS 7,246,933 B2 * 7/2007 Kunimochi ............... 362/620

FOREIGN PATENT DOCUMENTS

JP          2000299011 A  * 10/2000

* cited by examiner

*Primary Examiner*—Omar Rojas
(74) *Attorney, Agent, or Firm*—Leong C. Lei

(57) ABSTRACT

A light guide plate includes a light incidence surface, a light reflection surface, and a light emission surface. The light emission surface forms a plurality of light-guiding structures, which are extended in a direction substantially perpendicular to a lengthwise direction of a light source. The light-guiding structures have a substantially V-shaped cross-section and, among the light-guiding structures, those arranged in opposite endwise zones of the light emission surface in the lengthwise direction have an irregular V-shaped cross-section defined by a long inclined side, which faces endwise, and a short inclined side. The long and short sides respectively form first and second inclined angles with respect to the light emission surface and the first included angle is smaller than the second included angle and the first inclined angle gets smaller with the associated light-guiding structure located closer to the lengthwise end.

2 Claims, 6 Drawing Sheets

US 7,529,461 B1

LIGHT GUIDE PLATE WITH COMPENSATED EMISSION LIGHT FIELD

BACKGROUND OF THE INVENTION (a) Technical Field of the Invention The present invention relates to a light guide plate, and in particular to a light guide plate that compensates and correct a light field generated therein to enhance uniformity of light emission thereof.

(b) Description of the Prior Art

As shown in FIG. 1 of the attached drawings, conventionally, a light guide plate 1 comprises a light incidence surface 11, a light reflection surface 12, and a light emission surface 13. The light incidence surface 11 receives the incidence of light from a mated light source A, which is often a linear light source coextensive with the light incidence surface 11 of the light guide plate 1. The light gets into the light guide plate 1 through the light incidence surface 11 and transmits deeply into the light guide plate 1. A portion of the light that transmits into the light guide plate 1 reaches the light reflection surface 12 at which the portion of the light is reflected toward the light emission surface 13. To enhance convergence of the light, both the light emission surface 13 and the light reflection surface 12 are provided with parallel and elongated light-guide structures 131, 121, which are composed of raised ribs having V-shaped cross-sections. The light-guide structures 131 of the light emission surface 13 are extended in a direction substantially normal to the linear light source A, while the light-guiding structures 121 of the light reflection surface 12 are substantially parallel to the light source A. With this arrangement, when transmitting through or reflected by or otherwise interacting with side faces of the rib-like light-guiding structures 131, 121 to leave the light guide plate 1, can realize multi-directional light convergence.

Such a conventional structure of light guide plate, although effective in realizing multidirectional light convergence, still suffers drawbacks. This is due to the fact that when the light source A gives off light, divergence angles of the light occur at opposite ends of the light source A, as shown in FIGS. 2 and 3, so that when the light enters the light guide plate 1, the distribution of light field close to the opposite ends of the light guide plate 1, which correspond to the ends of the light source A, shifts toward the ends. This prevents the V-shaped light-guiding structures 121 of the light reflection surface 12 from providing the optimum performance over the shifted light field and consequently, the coordination between the light reflection surface 12 with the light emission surface 13 to ensure excellent light emission cannot be achieved, which leads to poor overall light emission of the light guide plate 1. In view of the above discussed drawback, it is desired to provide a light guide plate that compensates the drawback caused by the light divergence angle of the light source.

SUMMARY OF THE INVENTION

The primary purpose of the present invention is to provide a light guide plate that overcomes the problem that divergence angles are induced at lengthwise ends of a light source that provides light to the light guide plate and cause end portions of light field within the light guide plate to shift endwise, leading to poor performance of the light emitted from the light guide plate.

To realize the above objective of the present invention, a light guide plate is provided, comprising a light incidence surface, a light reflection surface, and a light emission surface. The light emission surface forms a plurality of light-guiding structures, which are extended in a direction substantially perpendicular to a lengthwise direction of a light source that is arranged to provide light to the light guide plate. The light-guiding structures have a substantially V-shaped cross-section and, among the light-guiding structures, those arranged in opposite endwise zones of the light emission surface in the lengthwise direction have an irregular V-shaped cross-section defined by a long inclined side and a short inclined side. The long and short sides respectively form first and second inclined angles with respect to the light emission surface and the first included angle is smaller than the second included angle and the first inclined angle gets smaller with the associated light-guiding structure located closer to the lengthwise end.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
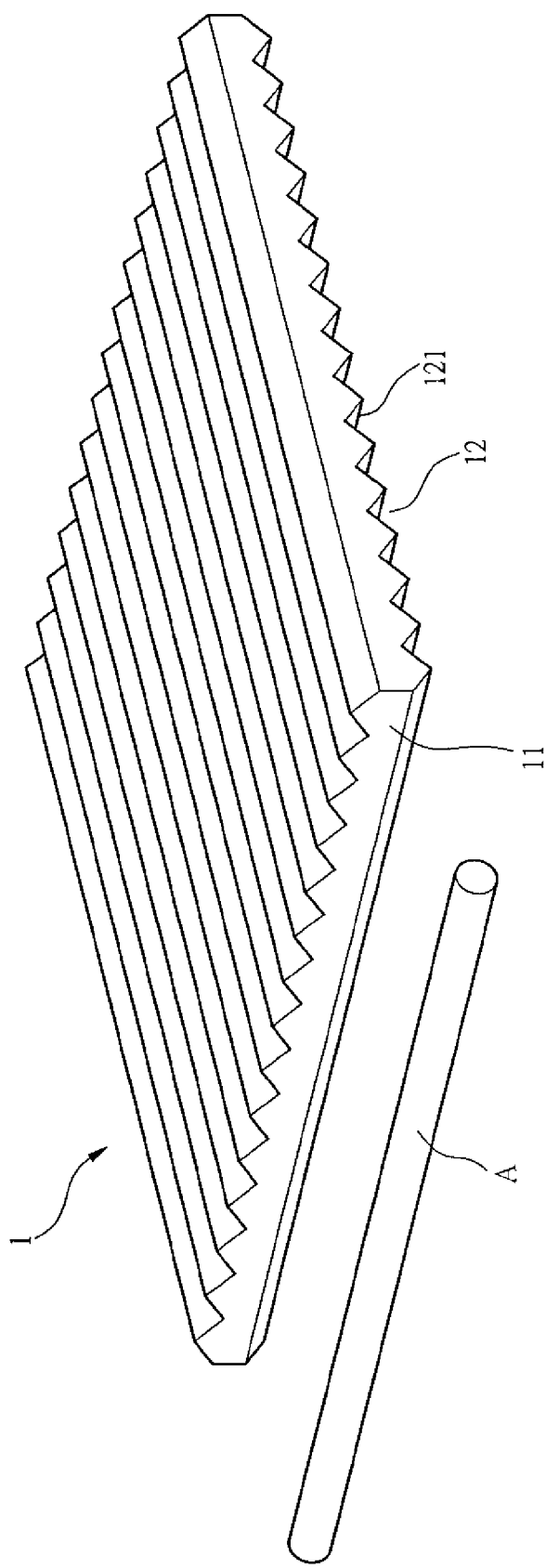
FIG. 1 is a perspective view of a conventional light guide plate, together with a light source that provides light to the light guide plate.
Figure 2:
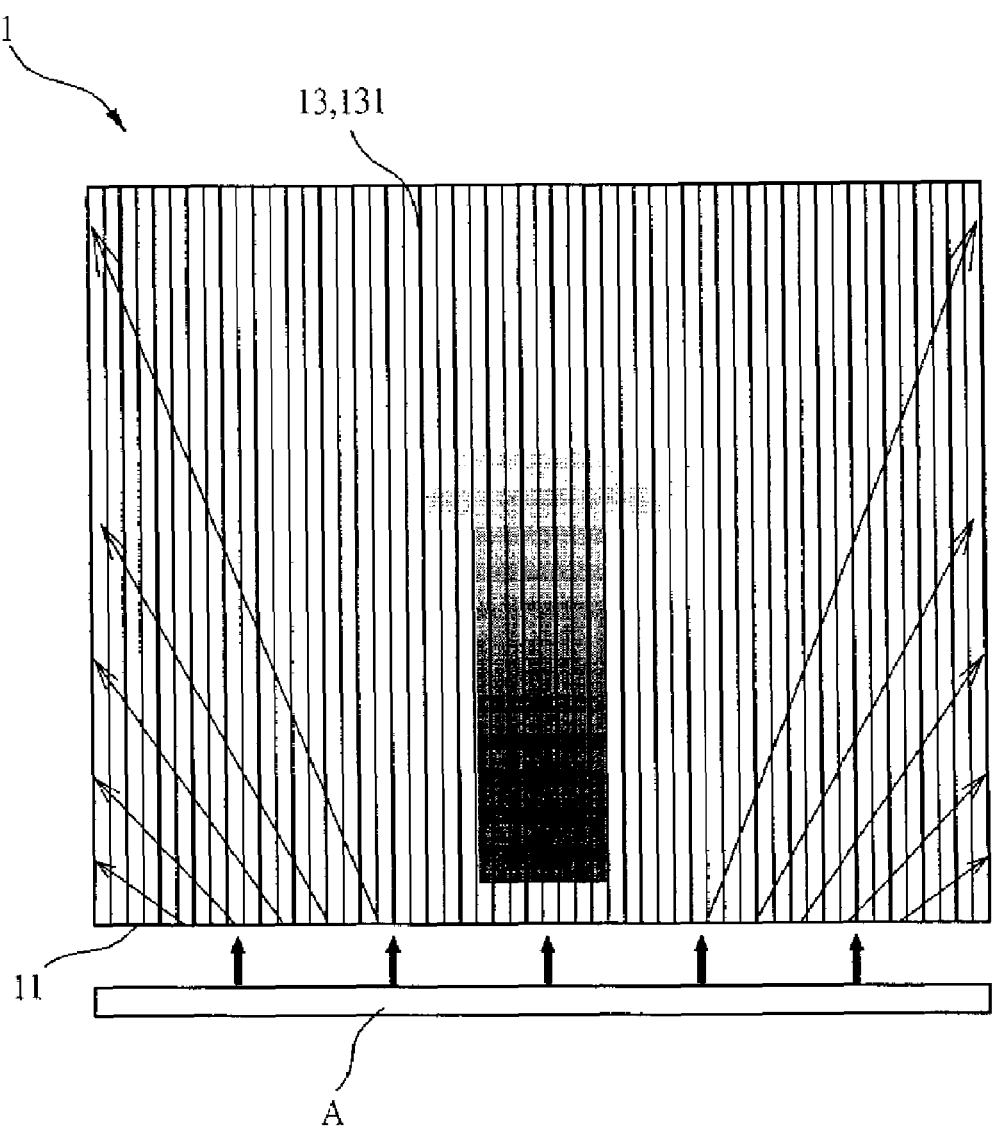
FIG. 2 is a plan view schematically illustrating transmission of light within the conventional light guide plate.
Figure 3:
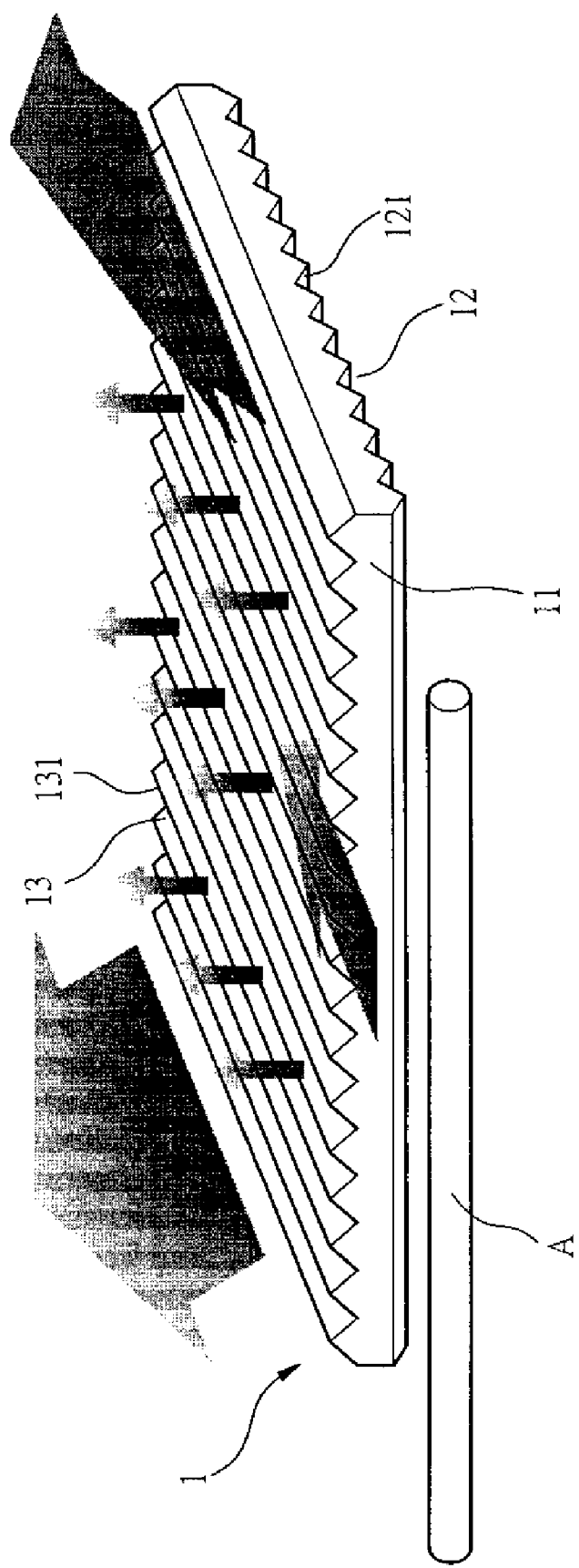
FIG. 3 is a perspective view illustrating an emission light field generated by the conventional light guide plate.
Figure 4:
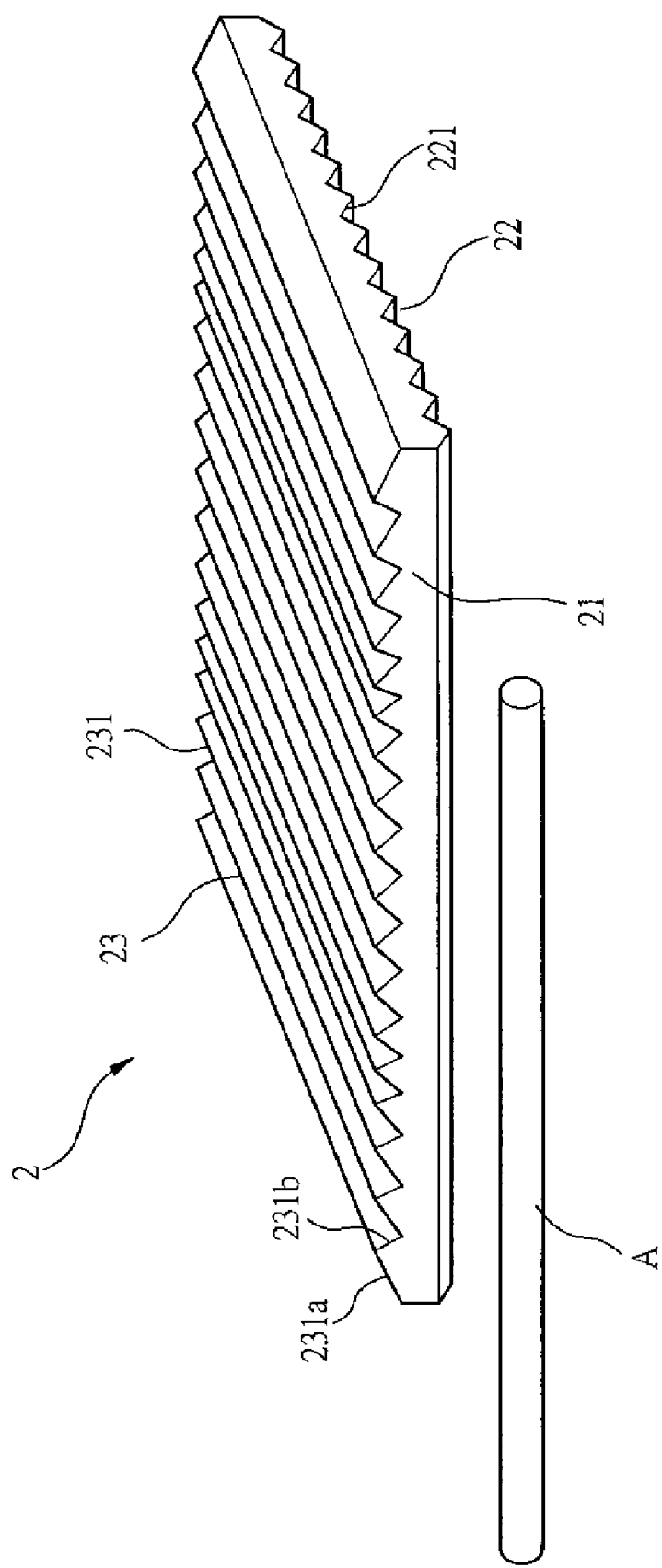
FIG. 4 is a perspective view showing a light guide plate constructed in accordance with the present invention, together with a light source that provides light to the light guide plate.
Figure 5:
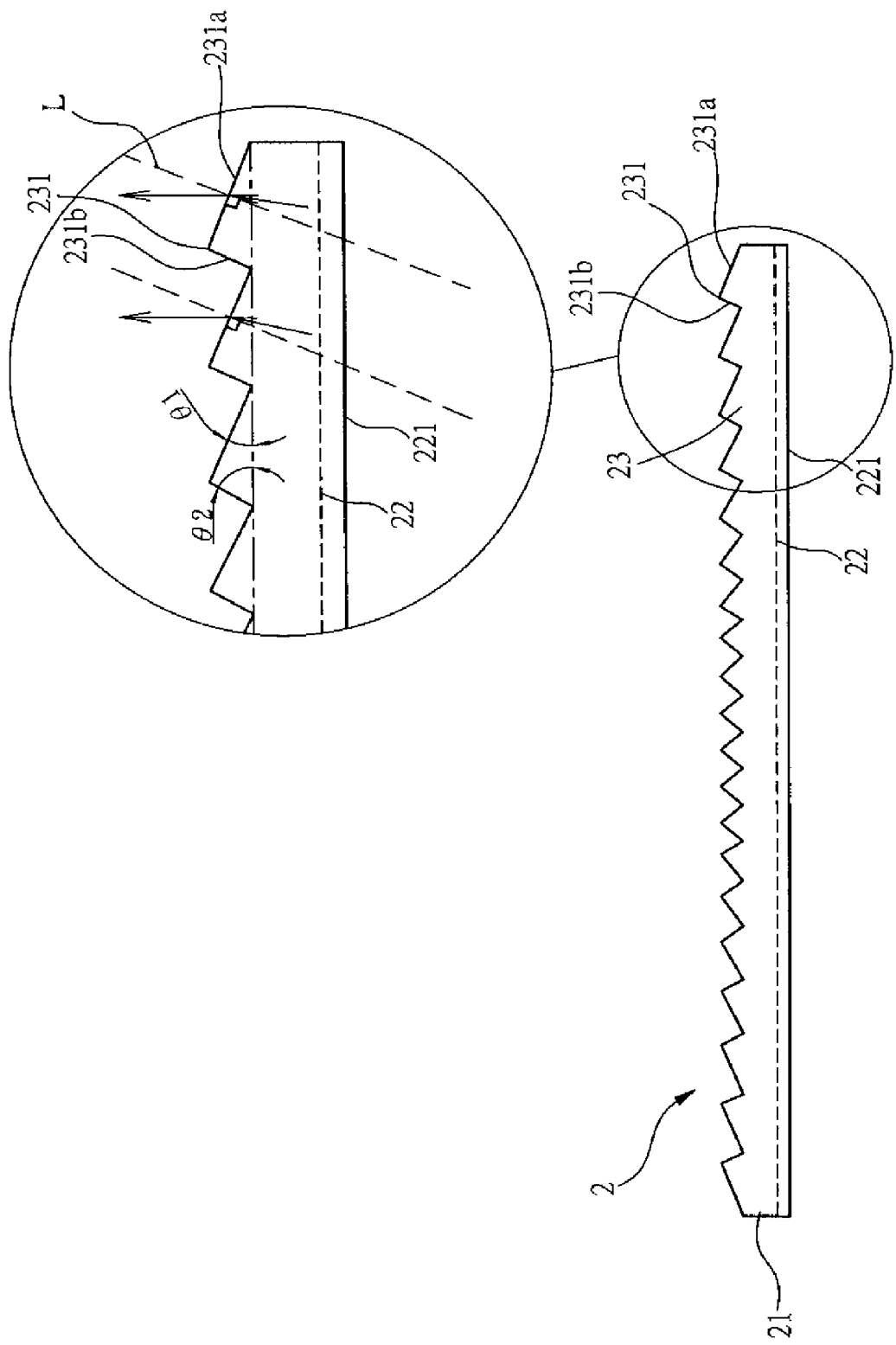
FIG. 5 is a side elevational view of the light guide plate in accordance with the present invention, with a portion thereof being separately magnified to illustrate transmission of light through the light guide plate.
Figure 6:
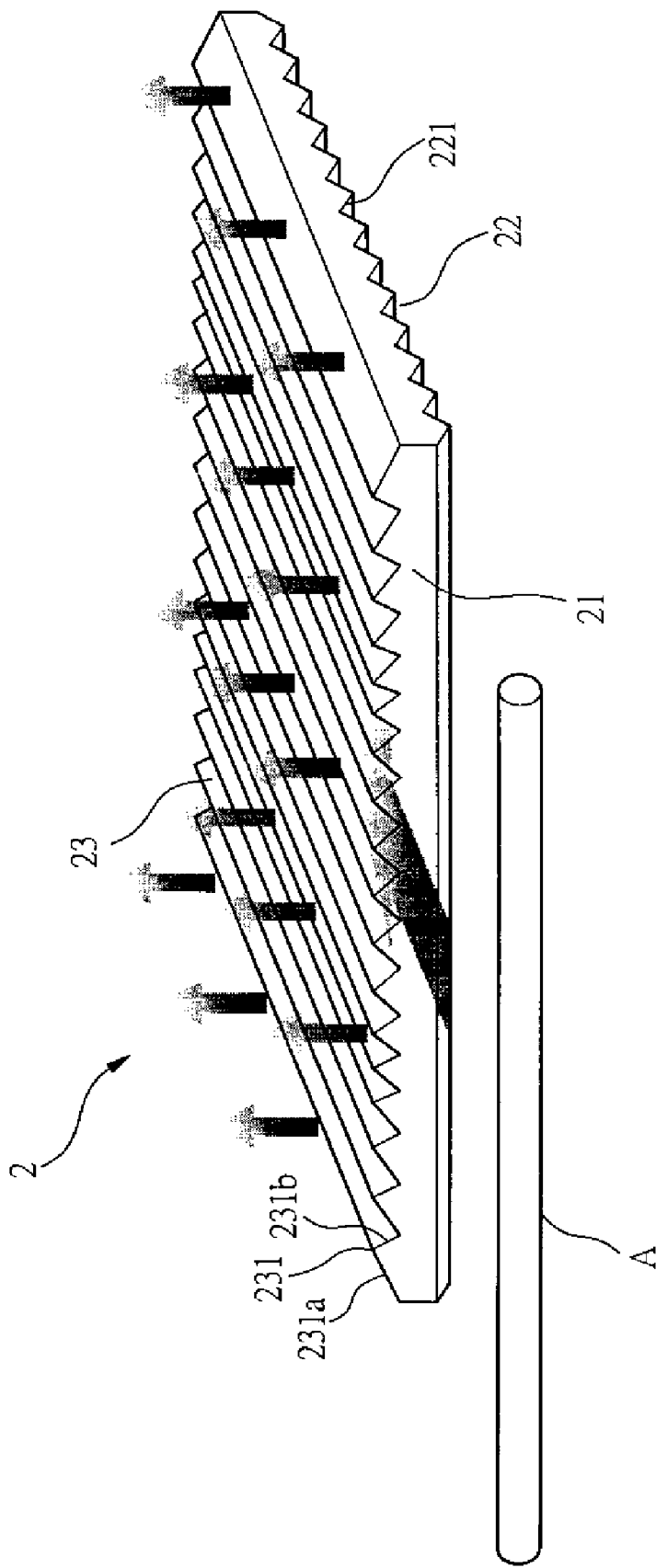
FIG. 6 is a perspective view illustrating an emission light field generated by the light guide plate of the present invention.

With reference to the drawings and in particular to FIGS. 4-6, a light guide plate constructed in accordance with the present invention, generally designated with reference numeral 2, comprises a light incidence surface 21, a light reflection surface 22, and a light emission surface 23.

The light incidence surface 21 is arranged to receive light emitted from a light source A, which in the embodiment illustrated is an elongate lamp tube having a lengthwise direction. The light from the light source A enters the light guide plate 2 through the light incidence surface 21 and travels deeply into the light guide plate 2.

The light reflection surface 22 constitutes one of the major surfaces of the light guide plate 2 and is adjacent to the light incidence surface 21. Formed on the light reflection surface 22 is a plurality of light-guiding structures 221, which are elongate raised projections or ribs having a substantially V-shaped cross-section, which has opposite inclined sides, and extending in a direction substantially parallel to the lengthwise direction of the light source A, and are preferably parallel to each other.

The light emission surface 23 constitutes an opposite one of the major surfaces of the light guide plate 2, which is opposite to the light reflection surface 22 and is adjacent to the light incidence surface 21. Formed on the light emission surface 23 is a plurality of light-guiding structures 231, which are elongate raised projections or ribs each having a substantially V-shaped cross-section, which has opposite inclined sides, and extending in a direction substantially perpendicular to the lengthwise direction of the light source A, and are preferably parallel to each other. Thus, the light-guiding structures or ribs 231 of the light emission surface 23 are distributed in a direction parallel to the lengthwise direction of the light source A from a middle location where a central rib 231 is located toward opposite lengthwise ends where endmost ribs 231 are located. Among the V-shaped light-guiding structures or ribs 231, the central rib 231 is of a regular V-shape cross-section, namely having isosceles sides and the other ribs (endwise ribs) 231 that are endwise offset from the central rib 231 are of an irregular V-shape, which comprises a long inclined side 231a and a short inclined side 231b (which will be referred to as long side and short side respectively hereinafter) with the short side 231b facing the central rib 231 and the long side 231a facing the lengthwise end of the light emission surface 23. The long side 231a and short side 231b of the rib 231 respectively form inclined angles $\theta_1$ and $\theta_2$ with respect to the light emission surface 23 of the light guide plate 2 and the light-guiding structures or ribs 231 are arranged in such a way that the included angle $\theta_1$ is smaller than the included angle $\theta_2$ and the included angle $\theta_1$ gets smaller with the distance thereof with respect to the central rib increased. In other words, the included angle $\theta_1$ is smaller when the rib 231 is located away from the central rib and closer to the lengthwise end of the light emission surface 23.

In a practical application, as shown in FIG. 5, light is emitted from the fight source A and enters the light guide plate 2 through the fight incidence surface 21. A portion of the light entering the light guide plate 2 travels toward the light reflection surface 22 and is reflected toward the light emission surface 23. With the light-guiding structures or ribs 231 of the light emission surface 23 substantially perpendicular to the lengthwise direction of the light source A and the light-guiding structures or ribs 221 of the fight reflection surface 22 substantially parallel to the lengthwise direction of the light source A, when the light transmits through or reflected by or otherwise interacts with the inclined sides of the V-shaped light-guiding structures or ribs 231, 221 to leave the light guide plate 2, multi-directional convergence of the light can be realized.

Further, when the light enters the light guide plate 2, the light field inside the light guide plate 2 is shifted toward the lengthwise ends of the light guide plate 2. Due to the arrangement of the light-guiding structures 231 on opposite end zones of the light emission surface 23 having an irregular V-shape that has a long side 231a and a short side 231b with the long side 231a facing the lengthwise end of the light emission surface 23, when light transmits through and is refracted by the long side 231a of each irregular V-shaped light-guiding structure 231 to leave the light guide plate 2, the light is directed in a direction away from the normal L of the long side 231a to thereby travel in a desired light emission direction by which the light emits from the light emission surface 23. Further, with the arrangement that the included angle $\theta_1$ of the long side 231a of the light-guiding structure 231 gets smaller in approaching the lengthwise end of the light emission surface 23, which corresponds to smaller inclination of the surface constituting the long side 231a, refraction of different extent can be realized by the long sides 231a that are of gradually reduced inclination in a direction toward the lengthwise end and this enhances uniformity of light emission from the light guide plate 2 as shown in FIG. 6.

The effectiveness of the present invention is that the light emission surface 23 of the light guide plate 2 is provided with a plurality of light-guiding structures or ribs including a central rib and a plurality of endwise ribs that are located on opposite sides of the central rib and each have an irregular V-shaped cross-section having a long side 231a and a short side 231b, the long side 231a forming an included angle $\theta_1$ with respect to the light emission surface 23, which angle gets smaller when approaching the lengthwise end of the light emission surface 23, whereby the long sides 231a of the endwise ribs 231 are set at different inclined angles, which causes refraction of light toward different directions for compensating the shifting of light field and correcting the light emission direction of the light leading to enhanced uniformity of the light emission.

Thus, the light guide plate of the present invention is effective in compensating shifting of light field and coning the light emission direction to thereby enhance uniformity of light emission and brightness of the light emitted from the light guide plate of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. In a light guide plate comprising a light incidence surface, a light reflection surface, and a light emission surface, said light incidence surface being arranged to receive light emitted from an elongated light source having a lengthwise direction, said light reflection surface being formed with a plurality of light guiding ribs which are elongate raised projections each having a V-shaped cross-section and having opposite inclined sides and extending in a direction parallel to said lengthwise direction of said light source, said light emission surface being opposite to said light reflection surface and adjacent to said light incidence surface, said light emission surface being formed with a plurality of light guiding ribs which are elongate raised projections each having a V-shaped cross-section and having opposite inclined sides and extending in a direction perpendicular to said lengthwise direction of said light source, the improvement wherein a central one of said light guiding ribs of said light emission surface has a regular V-shape cross-section and other ones of said light guiding ribs of said light emission surface are endwise offset from said central one and have a long inclined side and a short inclined side with said short side facing said central one and said long side facing a lengthwise end of said light emission surface, said long side and said short side respectively forming inclined angles $\theta 1$ and $\theta 2$ with respect to said light emission surface and said light-guiding ribs being arranged in such a way that said included angle $\theta 1$ is smaller than said included angle $\theta 2$ and said included angle $\theta 1$ gets smaller with distance thereof with respect to said central rib increases.

2. The light guide plate as claimed in claim 1, wherein said light guiding ribs of said light emission surface are parallel to each other.

\* \* \* \* \*